Patented Feb. 7, 1950

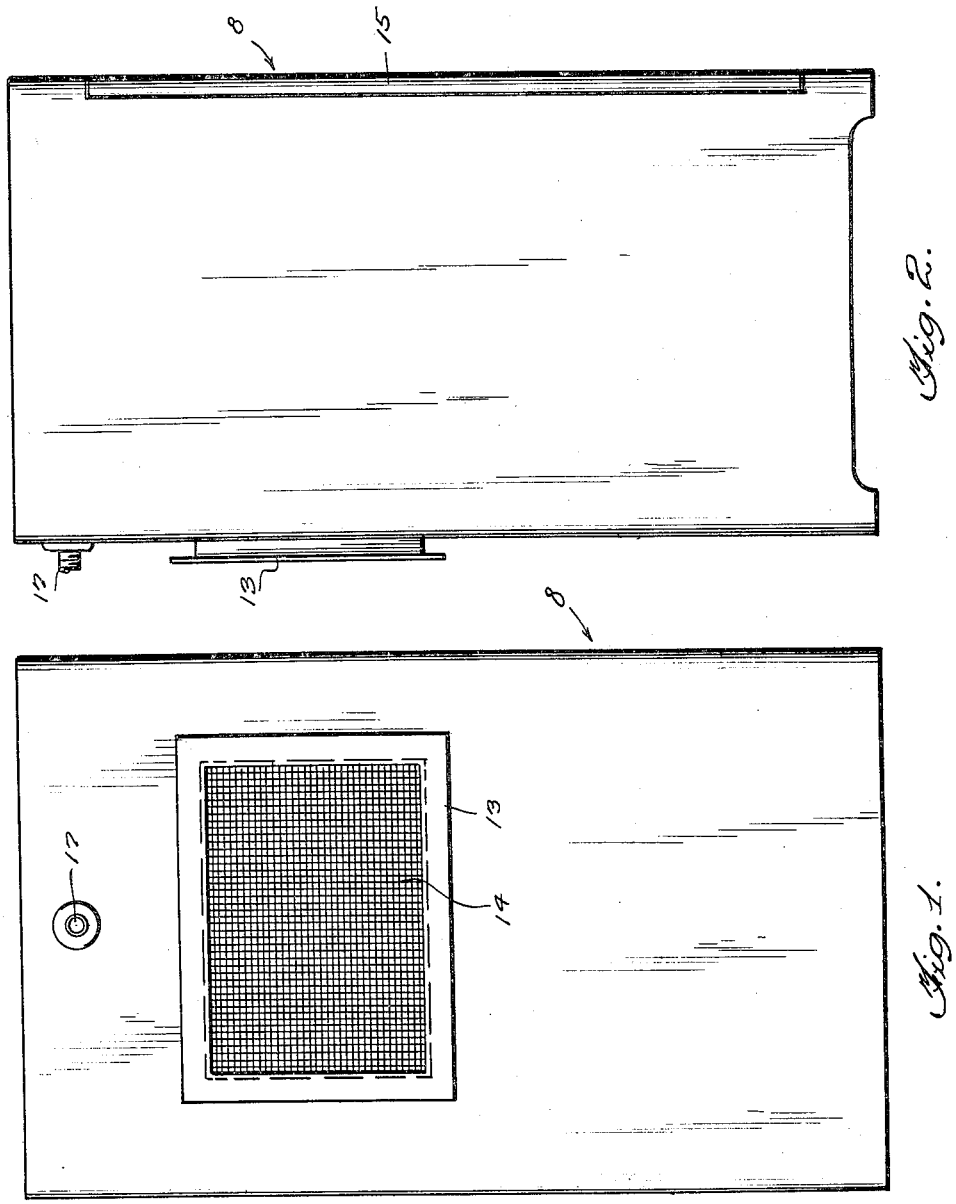

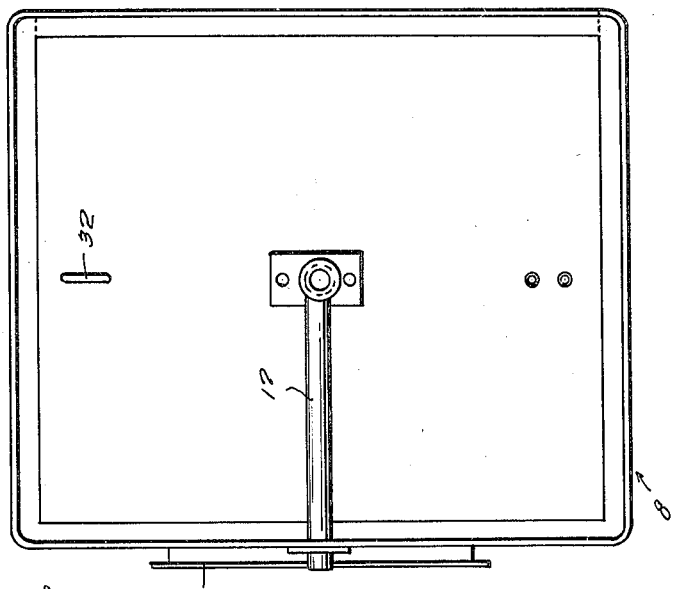
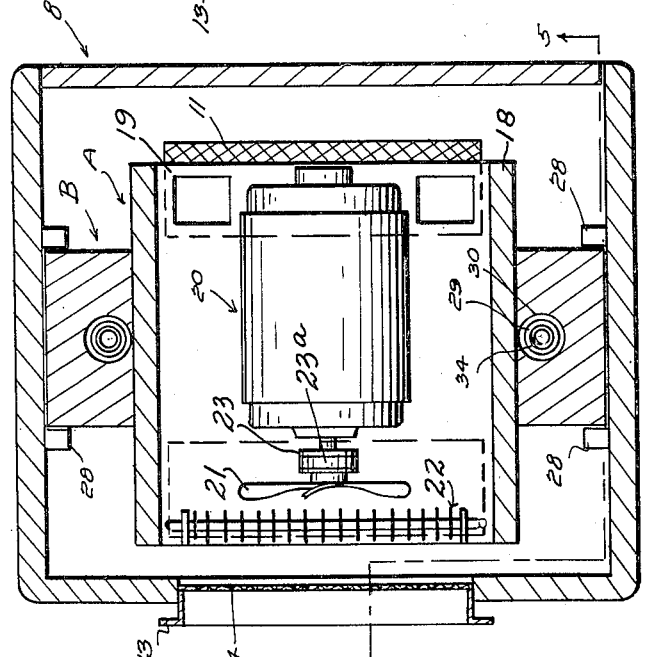

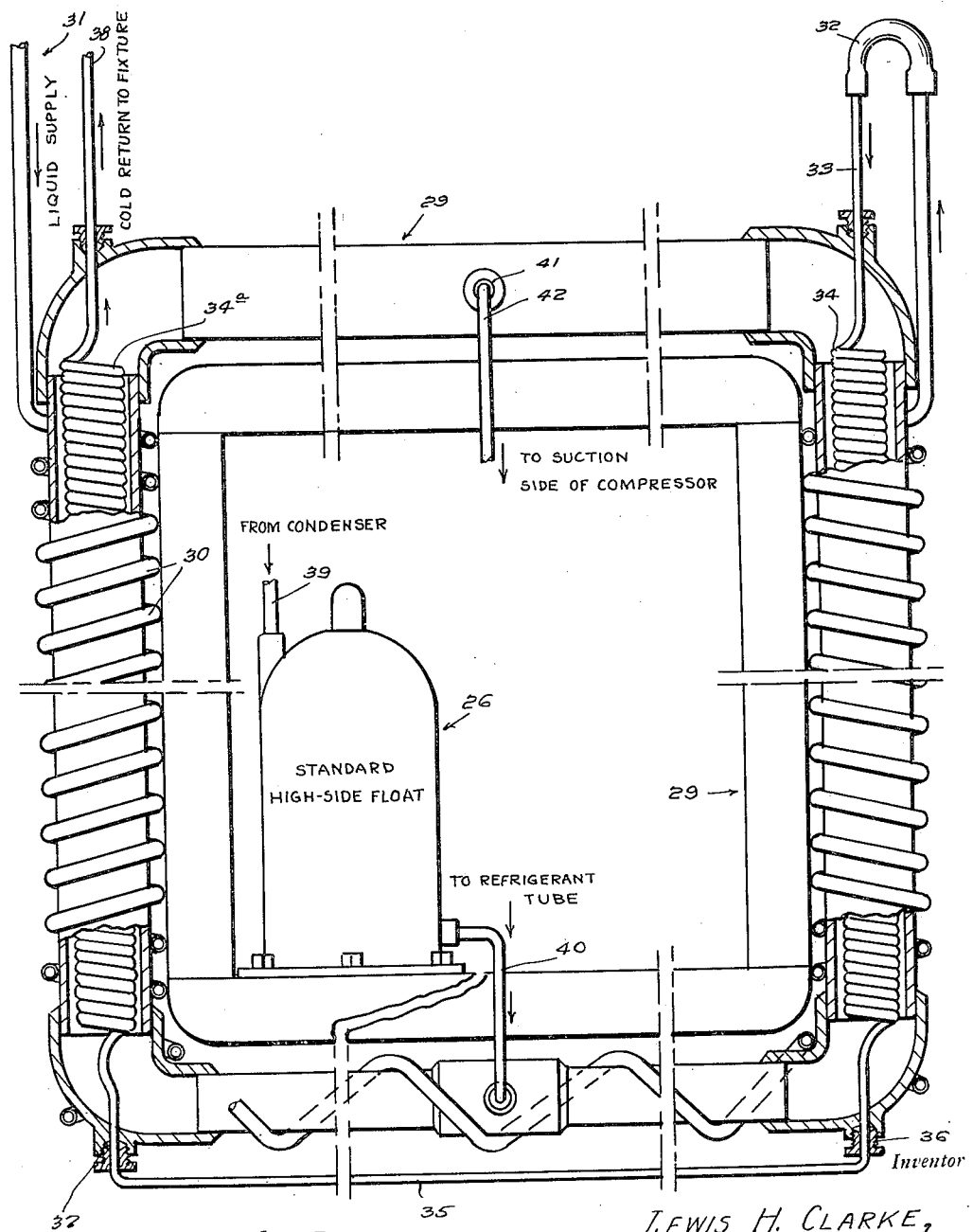

2,496,777

UNITED STATES PATENT OFFICE 2,496,777

LIQUID COOLER

Lewis H. Clarke, Brookline, Mass.

Application December 11, 1944, Serial No. 567,674

5 Claims. (Cl. 62—141)

This invention relates to refrigeration type cooling means for liquids, for example, beverages and drinking water, and has more specific reference to a structural device or unit which lends itself to proper usage in a drinking water fountain, the styling and construction being such as to "take in" regular city water, at conventional pressure, and to subject it to a tortuous passage and the influence of cooling media and means, whereby to render it sufficiently cool for drinking purposes.

In carrying out the principles of the invention I provide a novel and improved selection and assemblage of coacting mechanical elements, these being so interrelated in the complete assemblage to promote compactness and convenience of arrangement, whereby to make for ready accessibility, adjustment and repairs, these being important prerequisites in cooling machines of the types under advisement.

More specifically, novelty is thought to reside in the adoption and use of what may be designated as a central or core assembly, this characterized by a rectangular frame surrounding the compressor, electric motor, condensing coil, automatic switch means, automatic circulation control float and other coordinated details, thus providing a sort of main structural nucleus around which a complemental liquid circulating and cooling unit, properly insulated, is built. The latter unit is also in the form of a rectangular frame and surrounds the first frame and has enclosed therein a flooded type tube or conduit and fluid or water intake and return coils.

Additional novelty is predicated upon the adoption and use of a practicable and feasible cabinet, the aforementioned structural nucleus fitting with requisite nicety in said cabinet and said cabinet serving to promote accessibility for repair and other services, serving to properly circulate and clean the air and being virtually rodent and vermin resistant.

Other features and advantages will become more readily apparent from the following description and the accompanying illustrative drawings.

In the drawings, wherein like numerals are employed to designate like parts throughout the same:

Figure 1 is a rear elevational view observing the cabinet and showing the air currents exhaust screen.

Figure 2 is a side elevational view, that is a view at right angles to Figure 1 showing the front panel.

Figure 3 is a horizontal section taken approximately on a plane with the line 3—3 of Figure 5.

Figure 4 is a top plan view.

Figure 7 is an enlarged fragmentary view, partly in section and partly in elevation, showing the interfitting or telescoping association of the rectangular compressor and rotor nucleus unit and the surrounding liquid circulating and temperature reducing assemblage or unit.

Figure 5:
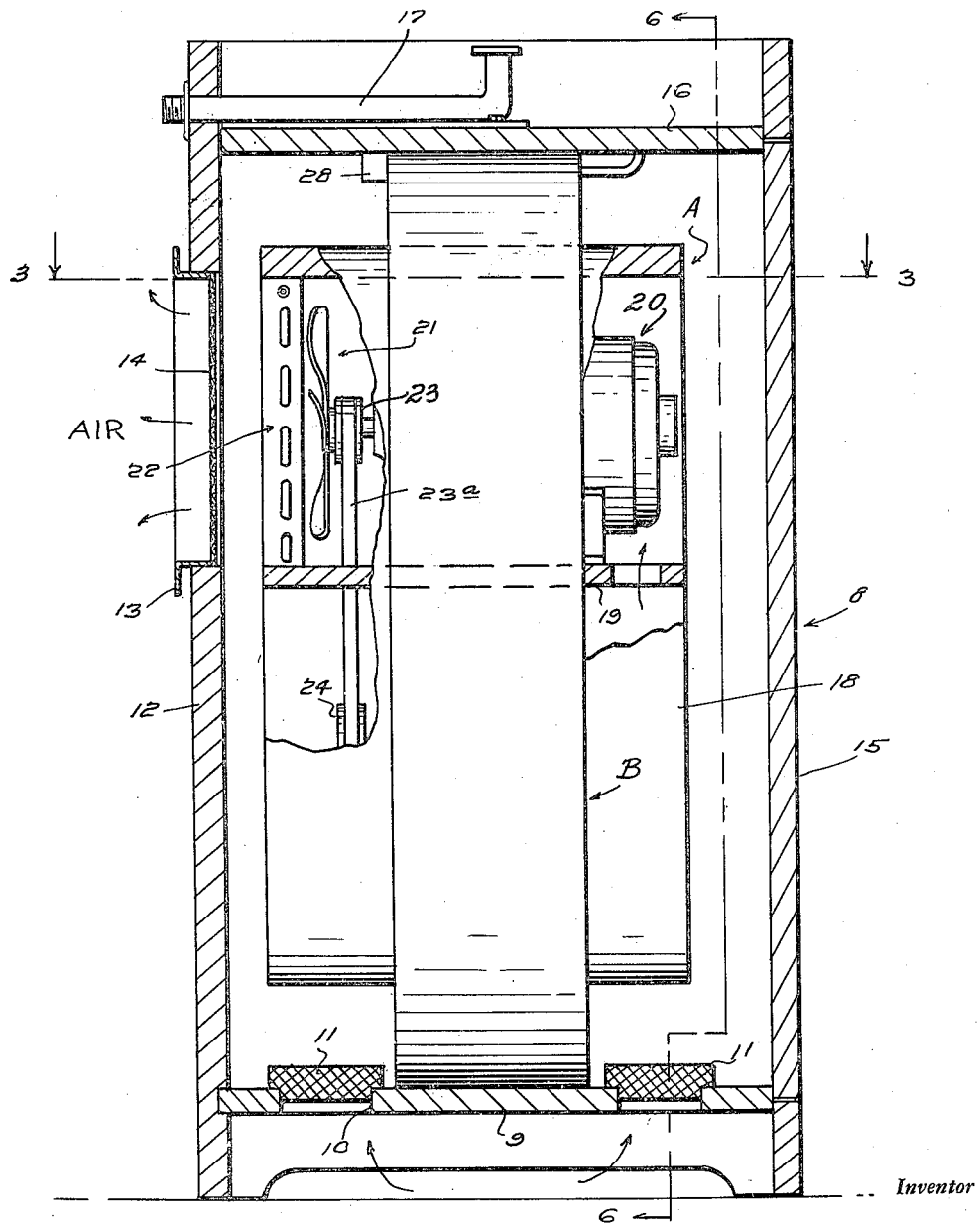
Figure 5 is a section taken on the plane of the somewhat irregular line 5—5 of Figure 3, looking in the direction of the arrows.

Attention is first directed to the cabinet means, the cabinet being generally denoted by the numeral 8. It is of appropriate dimension, shape and material. As shown in Figure 5, the bottom is elevated as at 9 and provided with surrounding air inlet openings or slots 10 these having suitable vermin and rodent proof filters or screens 11 mounted therein. The screened base is well above the depending skirt portion to allow for unimpeded intake and upward circulation of air currents as shown by the arrows. The rear wall 12 is provided with an opening in which a suitable frame 13 is located, said frame being provided with an air outlet or exhaust screen 14. The front panel 15 may be of any appropriate construction and is removable to permit access to be had to the structure on the interior of the cabinet. The top 16 is provided with an L-shaped overflow and drain pipe 17, this of any appropriate adaptability according to available plumbing fixtures and required hookups.

Figure 6:
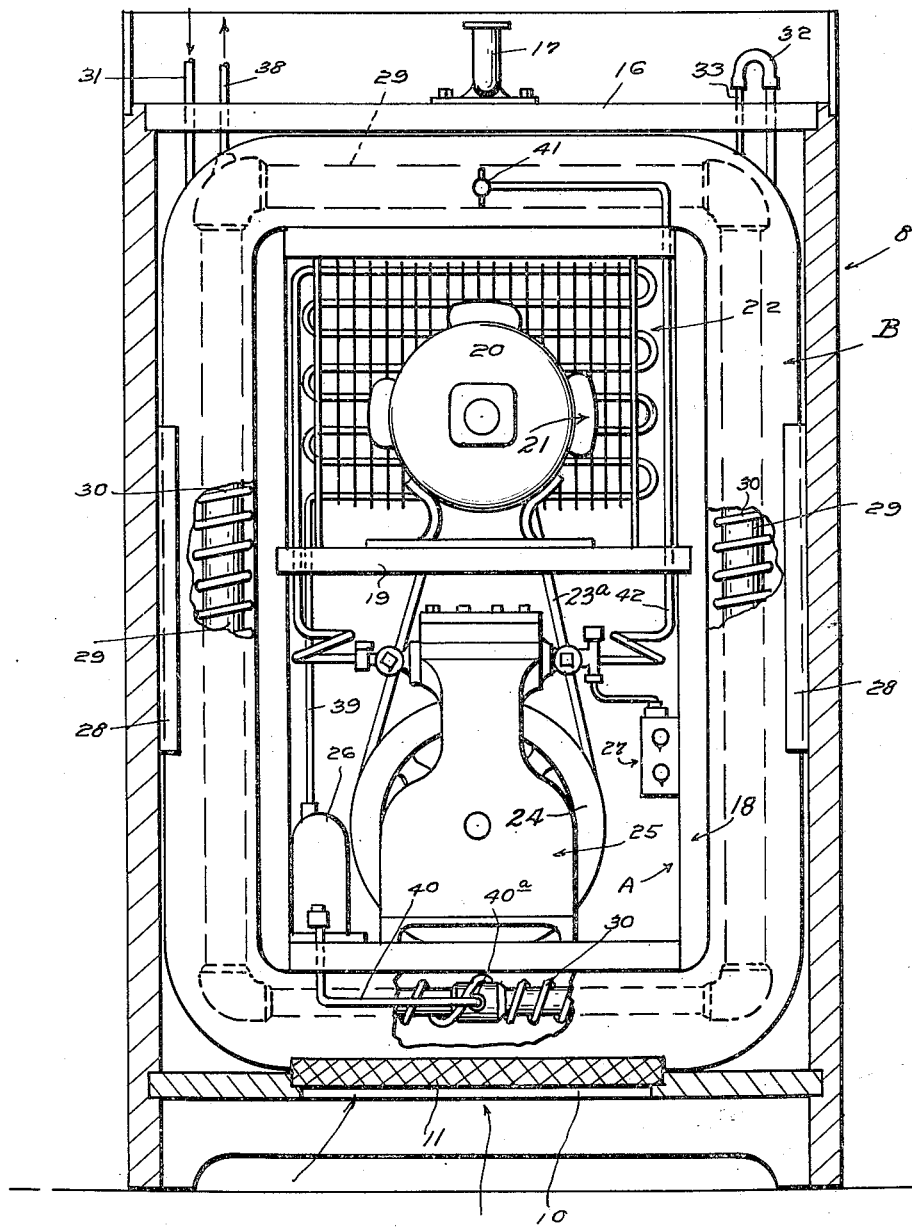
Figure 6 is a vertical section taken approximately on the plane of the line 6—6 of Figure 5, also looking in the direction of the arrows.

The aforementioned main structural nucleus or core unit is suitably suspended centrally in the cabinet and this is denoted by the reference character A. It is characterized by a substantially rectangular frame 18 of wood, plastic, metal or other appropriate material and dimensions. Said frame 18 is of rectangular form and is provided centrally with a central horizontal shelf 19 suitably apertured for air ventilation and circulation purposes, said shelf serving to support an electric motor 20, the motor driving a fan 21 and said fan being located inwardly of the reaches of the condensing coil structure 22. The coil structure 22 is provided with customary radiation fins and is mounted as a grille between the shelf 19 and the upper portion of the frame 18. The motor shaft drives the fan and also a pulley 23, which pulley in turn drives a belt 23a, this being trained over another pulley 24 on the compressor 25 (see Figure 6). As seen in Figure 6, the numeral 26 designates a standard high-side float and 27 designates a conventional automatic refrigerant flow-control and cut-out switch. This is piped to the suction side of the compressor 25. Thus, the unit A (frame 18 and surrounded compressor and associated parts) is a substantially intact assemblage such as promotes expedient manufacture, assembling, accessibility and repair accomplishments. It will be noticed that this unit A is so arranged in Figure 5 that the condenser and fan are in registry with the screened air outlet in the cabinet.

The companion and the surrounding insulated liquid circulating and refrigerating unit is denoted as B. Like unit A, unit B is also in the form of a rectangular frame-like structure and it marginally surrounds the frame of said unit A. Or, to put it otherwise, the unit A fits rather snugly into the unit B and the latter unit fits conformingly and neatly into the cabinet 8 as shown in Figure 6, said unit B being properly mounted and held by retaining blocks or the like, 28. Further, unit B is characterized by a substantially rectangular flooded type tube or conduit 29 of appropriate dimension, this constituting the liquid refrigerant receiver and evaporator tube. This tube, as brought out to advantage in Figure 7, is surrounded exteriorly by the convolutions 30 of the water or other liquid intake and supply line. We will assume that this is a supply of water from the regular city service source. The water comes into the coils or convolutions 30 by way of the intake line 31, and these convolutions wind down and around the left hand section of the tube 29, branch off and wrap around and across the bottom or horizontal section and then ascend and wind around the right hand vertical section at which point a goose-neck 32 is provided. This part of line 31 and its coils constitute the external pre-cooler arrangement. The goose-neck 32 is connected as at 33 with the tight-wound smaller convolutions 34, which constitute the interior temperature-reducing and final cooling coil means. It might be said that one coil 34 is housed in the right hand vertical section of the refrigerant tube and then branches out and horizontally across as at 35 (see Figure 7), the branch connections extending through suitable stuffing boxes 36 and 37 where the companion coil 34a is provided. The latter extends into and up through the left hand vertical section of the refrigerant tube and terminates in a discharge line 38 which, in turn, leads to the drinking fountain spigot or other fixture, (not shown). Thus, we have a flooded-type rectangular tube 29 for the refrigerant, an exterior and embracing liquid supply line 31 suitably coiled, as at 30, for pre-cooling, and an interior line 34—34a for final temperature lowering, cooling, and spigot supply purposes.

As seen in Figure 6, there is an appropriate pipe connection at 39 between the condenser 22 and float 26, a pipe connection 40 between said float and the lower horizontal reach of the refrigerant tube 29. There is a suction return-line connection between the upper reach of the tube 29 made at the point 41, and comprising pipe 42 which extends down and is connected to the suction side of the compressor 25. This constitutes the ways and means of automatically supplying and circulating the refrigerant to the tube 29 for effectively handling the liquid to be cooled at points between the liquid intake and discharge points 31 and 38 (see Figure 7).

I would repeat at this stage that the cabinet lends itself adaptable to constructions of wood, plastic, metal or other equivalent materials. It is rendered vermin and rodent proof by the screened and closed construction shown. I would stress the removable unit, and consequent accessibility for servicing of readily available parts. The construction is of a non-syphon tankless character. It is characterized by simplicity, durability and economy. The overall construction is substantially fool-proof and is adaptable to the construction of a machine which amply fulfills the requirements of both the manufacturers and the trade. In connection with the principles of operation and the commercial aspects, the following are worthy points to consider to wit:

It is common knowledge that if a liquid containing heat, is immersed or blended with a liquid containing less heat, the lesser heat containing liquid will absorb heat from that of the higher heat containing liquid.

To utilize one or the other liquids for a useful purpose, yet receive full co-operation, they must be brought into as close a state of mixture, or contact as possible. The more nearly to the aforesaid condition this is accomplished, the quicker and more efficient the heat is removed from the higher body or liquid to that of the lower.

Through the system of tubes and pipes shown, liquids are reduced to a mutual and desirable temperature by having heat from one liquid passing to that of the other by the aid of mechanical means.

In the processing of various liquids, such as water for drinking, beverages, milk, oils, photographic processing and developing, types of water baths, etc., certain temperatures in the liquids used are necessary and often must be kept constant. It is a feature of this device that these liquids can be kept at these desirable temperatures efficiently.

No detail is here brought out as to the details of engineering. Its practibility has been worked out, found practical and efficient.

The features of production, marketability, shipping, servicing, etc., are also interesting. It will be noted that the various parts and assemblies are easily produced in quantity lots, are also easily assembled. For servicing, all parts are easily accessible. Matters pertaining to shipping and packing are economical and desirable. Factors of sales appeal are wide and lend themselves to various approaches and applications, without too many types and models. The type shown and described is inter-changeable in its application, by the simple addition of a circulator.

The construction features are most desirable. The low-side is embedded within its separate frame, well insulated. This surrounds a high-side set within a frame. The two completely make up a unit which is self-contained, relies on its own foundation and can be thoroughly completed and tested (as well as shipped) without a cabinet being attached.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. In a refrigerated liquid cooler of the class described, a cabinet embodying a compartment having an elevated bottom with screened air inlet, a screened air outlet in one wall adjacent the upper portion of the cabinet, one wall of said cabinet being removable to form a panel this permitting access to be had to the compartment on the interior, a frame mounted in said compartment with its marginal portion spaced from the walls of the cabinet to permit free circulation of air around all areas, said frame being adapted to support a motor, compressor and other parts, a frame-like insulating unit surrounding said first-named frame and having its marginal portions spaced from the walls of the cabinet, coacting pipes embedded in said insulating unit for liquid intake circulating and return purposes and refrigerant circulating and return purposes.

2. In a liquid cooler construction of the class described, a substantially rectangular frame-like insulation member, a correspondingly shaped refrigerant tube wholly embedded in said insulation member, pipe means for operatively hooking up said tube with a compressor, a liquid circulating pipe having a multiplicity of convolutions exteriorly surrounding predetermined sections of said tube and also embedded in said insulation member, interconnected coiled liquid return elements on the interior of pre-determined sections of said tube, said liquid circulating pipe being connected with said liquid return elements, one of said elements having a cold liquid discharge terminal.

3. In a water cooler of the class shown and described, a cabinet defining a compartment and provided with an elevated bottom having screened air inlet openings, a screened air outlet opening in one wall of the said cabinet adjacent the upper portion of the latter, an insulated frame mounted between opposite walls and located in the central portion of said compartment, a frame-like tube wholly embedded in said insulated frame adapted to contain and circulate a refrigerant, a water supplying and cooled water return and dispensing pipe structure embodying a pre-cooling pipe with a portion coiled exteriorly around said tube and embedded in said frame, and another portion coiled in close coiled form within said tube.

4. In a water cooler of the class shown and described, a cabinet defining a compartment and provided with an elevated bottom having screened air inlet openings, a screened air outlet opening in one wall of the said cabinet adjacent the upper portion of the latter, an insulated frame mounted between opposite walls, and located in the central portion of said compartment, a frame-like tube wholly embedded in said insulated frame adapted to contain and circulate a refrigerant, a water supplying and cooled water return and dispensing pipe structure embodying a pre-cooling pipe with a portion coiled exteriorly around said tube and embedded in said frame, and another portion coiled in close coiled form within said tube, and a second frame corresponding in shape to that of the first named frame and telescoped and nested within the confines of the first frame, said second frame being provided with a central shelf horizontally disposed, an electric motor mounted on and above said shelf and embodying an air circulating fan, a condenser mounted in the upper portion of the second frame and at right angles to and lined up with said shelf, said condenser being associated with said fan, a compressor mounted in the lower portion of said second named frame and underneath of said shelf, an operating connection between the motor and compressor, and pipe means affording communication between the compressor and condenser.

5. A ready-to-install structure for placement in a compartment in a ventilated cabinet comprising a substantially rectangular frame adapted for vertical disposition and having a central horizontal partition forming a shelf, a condenser within the marginal confines of said frame and located in the space between the shelf and one end portion of the frame, an electric motor mounted on said shelf within the confines of said frame, said motor being provided with an air circulating fan and said fan and motor being lined up for registry with said condenser, a compressor mounted in said frame beneath said shelf, an operating connection between the motor and compressor, and communicating and circulating pipe connections between the compressor and condenser, a second rectangular frame completely surrounding the first frame, said second frame being of insulation material, a refrigerant containing and circulating tube of rectangular form embedded with its sections located in corresponding sections of the second frame, a pipe connection between the compressor and one of the sections of said refrigerant tube, a second pipe connection between another section of the tube and condenser, and a water supply, circulating, cooling and returning pipe having certain portions surrounding the tube and embedded in the second frame and certain portions confined within the sections of the tube and leading to the exterior of the second frame to dispense the cooled water.

LEWIS H. CLARKE.

REFERENCES CITED

The following references are of record in the file of this patent:

UNITED STATES PATENTS

| Number | Name | Date |
| --- | --- | --- |
| 1,878,225 | Wright | Sept. 20, 1932 |
| 2,010,413 | Peltier | Aug. 6, 1935 |
| 2,024,297 | Macready | Dec. 17, 1935 |
| 2,039,188 | Reeves | Apr. 28, 1936 |
| 2,052,410 | Kucher | Aug. 25, 1936 |

FOREIGN PATENTS

| Number | Country | Date |
| --- | --- | --- |
| 17,023 | Great Britain | Sept. 23, 1899 |